(12) United States Patent
Yokota et al.

(10) Patent No.: US 9,696,727 B2
(45) Date of Patent: Jul. 4, 2017

(54) FLUID CONTROL APPARATUS AND THERMAL SENSOR INSTALLATION STRUCTURE WITH RESPECT TO FLUID CONTROL APPARATUS

(71) Applicant: FUJIKIN INCORPORATED, Osaka-shi (JP)

(72) Inventors: Jun Yokota, Osaka (JP); Takahiro Yoshida, Osaka (JP); Thanh T. Nguyen, Osaka (JP); Takahiro Matsuda, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 14/772,828

(22) PCT Filed: Feb. 17, 2014

(86) PCT No.: PCT/JP2014/053609
§ 371 (c)(1),
(2) Date: Sep. 4, 2015

(87) PCT Pub. No.: WO2014/136557
PCT Pub. Date: Sep. 12, 2014

(65) Prior Publication Data
US 2016/0018827 A1    Jan. 21, 2016

(30) Foreign Application Priority Data
Mar. 8, 2013    (JP) .................................. 2013-046867

(51) Int. Cl.
*F16K 31/02* (2006.01)
*G05D 7/03* (2006.01)
(Continued)

(52) U.S. Cl.
CPC ............. *G05D 7/03* (2013.01); *F16K 27/003* (2013.01); *F16K 37/0025* (2013.01);
(Continued)

(58) Field of Classification Search
CPC ......... G05D 23/22; G05D 7/03; G01M 3/002; G01K 13/02; F16K 37/0025; F16K 27/003
(Continued)

(56) References Cited

U.S. PATENT DOCUMENTS 3,857,282 A * 12/1974 Doorley et al. ........ G01F 1/115
137/271
4,016,758 A * 4/1977 Taylor .................... G01F 1/684
73/204.22
(Continued)

FOREIGN PATENT DOCUMENTS

JP    60-102639 U    7/1985
JP    07-074113 A    3/1995
(Continued)

OTHER PUBLICATIONS

International Search Report mailed Apr. 22, 2014, issued for PCT/JP2014/053609.

*Primary Examiner* — Mary McManmon
*Assistant Examiner* — Minh Le
(74) *Attorney, Agent, or Firm* — Locke Lord LLP

(57) ABSTRACT

The present invention provides a fluid control apparatus which allows installation of a thermal sensor for temperature control by a simple work by an effective utilization of a space in the fluid control apparatus, and a thermal sensor installation structure with respect to the fluid control apparatus. The fluid control apparatus 1 includes a first fluid control instrument 3 and a second fluid control instrument 4 adjacent to each other and the thermal sensor 17 configured (Continued)

to measure a temperature of a fluid flowing in the first fluid control instrument 3. The fluid control apparatus 1 further includes a supporting member 19 configured to support the thermal sensor 17 attached to the second fluid control instrument 4.

11 Claims, 4 Drawing Sheets

(51) Int. Cl.
  *F16K 37/00* (2006.01)
  *F16K 27/00* (2006.01)
  *G01K 13/02* (2006.01)
  *G01M 3/00* (2006.01)
  *G05D 23/22* (2006.01)

(52) U.S. Cl.
  CPC ............. *G01K 13/02* (2013.01); *G01M 3/002* (2013.01); *G05D 23/22* (2013.01)

(58) Field of Classification Search
  USPC .......... 137/486, 487.5, 613, 551; 73/152.33, 73/170.12, 202.5, 861.01, 866.5; 248/542
  See application file for complete search history.

(56) References Cited

U.S. PATENT DOCUMENTS

| | | | | |
|---|---|---|---|---|
| 5,771,919 A * | 6/1998 | Itoi | ........................ | F16K 27/003 137/454.6 |
| 5,921,428 A * | 7/1999 | Rodgers | ................... | G05D 9/02 137/386 |
| 6,007,034 A * | 12/1999 | Stoll | ................... | F15B 15/2892 248/229.1 |
| 6,018,994 A * | 2/2000 | Yonezawa | ............... | G01F 1/684 73/114.34 |
| 6,044,701 A * | 4/2000 | Doyle | ................... | G05D 7/0635 73/202 |
| 6,273,139 B1 * | 8/2001 | Ohmi | .................... | F16K 27/003 137/884 |
| 6,308,553 B1 * | 10/2001 | Bonne | ................... | G01F 1/6842 73/1.34 |
| 6,363,958 B1 * | 4/2002 | Ollivier | ................ | G05D 7/0647 137/2 |
| 6,490,229 B1 * | 12/2002 | Caver | .................. | G10K 11/006 367/173 |
| 6,561,216 B2 * | 5/2003 | Kurosawa | ............ | G05D 7/0635 137/486 |
| 6,843,139 B2 * | 1/2005 | Schumacher | ........... | G01F 1/363 73/861.52 |
| 6,929,397 B2 * | 8/2005 | Ren | ..................... | B29C 45/1782 24/20 R |
| 7,284,456 B2 * | 10/2007 | Lavoie | ................... | G01B 17/02 348/84 |
| 7,296,465 B2 * | 11/2007 | Ding | ..................... | G01F 1/6847 73/202.5 |
| 7,300,075 B2 * | 11/2007 | Ebskamp | ............... | G01F 15/185 137/454.6 |
| 7,552,643 B2 * | 6/2009 | Aikens | .................... | G01M 3/22 73/198 |
| 7,677,265 B2 * | 3/2010 | Shikata | ................ | F16K 27/003 137/341 |
| 8,454,232 B2 * | 6/2013 | Stoll | ....................... | F16B 33/02 374/142 |
| 8,544,352 B2 * | 10/2013 | Glatzel | ................... | G01F 1/684 73/204.22 |
| 9,091,380 B2 * | 7/2015 | Hayashi | ................. | F16L 23/10 |
| 9,188,989 B1 * | 11/2015 | Mudd | .................. | G05D 7/0635 |
| 9,335,768 B2 * | 5/2016 | Taskar | ................. | G05D 7/0641 |
| 2002/0038672 A1 | 4/2002 | Tsourides | | |
| 2004/0173270 A1 | 9/2004 | Harris et al. | | |
| 2007/0295414 A1 | 12/2007 | Shinoharo et al. | | |
| 2008/0140260 A1 * | 6/2008 | Ding | ........................ | G01F 1/68 700/282 |
| 2008/0302426 A1 * | 12/2008 | Mulligan | .............. | F16K 27/003 137/271 |
| 2009/0277510 A1 | 11/2009 | Shikata | | |

FOREIGN PATENT DOCUMENTS

| | | |
|---|---|---|
| JP | 2002-250645 A | 9/2002 |
| JP | 2006-083959 A | 3/2006 |
| JP | 2006-519339 A | 8/2006 |
| JP | 2006-349075 A | 12/2006 |
| KR | 10-2001-0026729 A | 4/2001 |

* cited by examiner

FLUID CONTROL APPARATUS AND THERMAL SENSOR INSTALLATION STRUCTURE WITH RESPECT TO FLUID CONTROL APPARATUS

TECHNICAL FIELD

The present invention relates to a fluid control apparatus used in a semiconductor manufacturing apparatus or the like and a thermal sensor installation structure with respect to the fluid control apparatus and, specifically, a fluid control apparatus formed by integrating a plurality of fluid control instruments and a thermal sensor installation structure with respect to such a fluid control apparatus.

BACKGROUND ART

In a fluid control apparatus used in a semiconductor manufacturing apparatus, a plurality of fluid control instruments are arranged adjacently, and lines attached to a supporting member are arranged in parallel on a base member, so that integration which constitutes part of the fluid control apparatus is in progress without the intermediary of a pipe and a joint, and heating means may be provided thereon (PTL 1).

In the fluid control apparatus as described above, temperature control is required, and examples of sensors preferable therefor include a thermal sensor.

CITED REFERENCE

Patent Literature

PTL 1: JP-A-2006-349075

SUMMARY OF INVENTION

Technical Problem

According to the integrated fluid control apparatus, since a plurality of the fluid control instruments are arranged adjacently, a sufficient space for installing the thermal sensor is missing, and a problem of being difficult to install arises.

It is an object of the present invention to provide the fluid control apparatus which allows installation of the thermal sensor for temperature control by a simple work by an effective utilization of a space in the fluid control apparatus, and a thermal sensor installation structure with respect to the fluid control apparatus.

Solution to Problem

A fluid control apparatus of the invention is a fluid control apparatus including a first fluid control instrument and a second fluid control instrument adjacent to each other and a thermal sensor configured to measure a temperature of a fluid flowing in a fluid channel of the first fluid control instrument, further including a supporting member attached to one of the first fluid control instrument and the second fluid control instrument to support the thermal sensor.

The fluid control apparatus includes a plurality of lines arranged in parallel and formed normally by the first fluid control instrument and the second fluid control instrument arranged adjacently in series, and a plurality of third and fourth fluid control instruments and the like arranged in series thereto.

The thermal sensor is, for example, a sensor using a thermal electromotive force (Seebeck effect) generated by a temperature gradient between different types of metals. The thermal sensor may be installed in all of the lines of the fluid control apparatus and may be arranged some of the lines.

The supporting member configured to support the thermal sensor is attached to any one of the first fluid control instrument and the second fluid control instrument. In the case where the thermal sensor is attached to the first fluid control instrument, the supporting member may be attached by using the second fluid control instrument. However, in the case where attaching to the first fluid control instrument is easier, the supporting member may be attached by using the first fluid control instrument. Accordingly, installation of the thermal sensor is achieved by using the space in the fluid control instrument effectively and with a simple work.

The first fluid control instrument measured by the thermal sensor is, for example, a flow rate controller. However, it is not limited thereto, and may be the first fluid control instrument whereby an opening-and-closing valve, a regulator, a filter, and a channel block are measured by the thermal sensor as needed. The second fluid control instrument adjacent to the first fluid control instrument measured by the thermal sensor is, for example, the opening-and-closing valve. However, the flow rate controller, the regulator, the filter, the channel block, or the like is the second fluid control instrument adjacent to the first fluid control instrument as needed.

The first fluid control instrument is configured to control a flow rate (a mass flow controller or a fluid variable flow rate control apparatus), and the second fluid control instrument is preferably the opening-and-closing valve configured to block and release the fluid channel of the first fluid control instrument.

The second fluid control instrument (opening-and-closing valve) includes a casing having an opening-and-closing mechanism integrated therein, and the supporting member is preferably detachably attached to the casing from above the casing.

The fluid control instrument which controls the flow rate (that is, the mass flow controller, the fluid variable flow rate control apparatus, or the like) is a principle fluid control instrument arranged one per one line, and the opening-and-closing valve is always arranged adjacent thereto. Therefore, the temperature of a fluid flowing in the fluid control instrument which controls the flow rate is measured, and the supporting member of the thermal sensor is arranged by using the opening-and-closing valve, so that the structure of installation of the thermal sensor does not have to be change even when the number and the types of the fluid control instruments which constitute the single line vary.

Preferably, the first fluid control instrument (in other words, the mass flow controller, the fluid variable flow rate control apparatus, and the like) includes a leak port, and a detecting end portion of the thermal sensor is inserted into the leak port.

The leak port is used when testing the presence or absence of leakage, and by using this, the fluid temperature can be measured at a position close to the fluid without performing an additional work, and hence the fluid temperature can be measured accurately.

As long as the thermal sensor is capable of measuring the temperature by inserting the detecting end portion thereof into the leak port, various types may be used.

Preferably, the supporting member includes an annular main body provided with a slit at one position in a circumferential direction, and a pair of projecting portions provided integrally with the main body so as to extend the slits provided with the main body radially outward, and an inner peripheral surface of the main body has a shape corresponding to an outer periphery of a top wall of the casing.

In this configuration, attachment of the supporting member to the fluid control instrument is achieved easily.

Preferably, one of the projecting portions is provided with a screw insertion hole for allowing insertion of a male screw for the supporting member from an opposite surface to a surface opposing the other projecting portion, and the other projecting portion is provided with a female screw portion with which the male screw for the supporting member engages so as to extend in the same direction as the screw insertion hole.

In this configuration, by tightening the male screw for the supporting member, a width of the slit is narrowed and the supporting member is fixed to the fluid control instrument, so that the attachment of the supporting member with respect to the fluid control instrument is achieved easily.

The screw insertion hole and the female screw portion are provided so that the screw insertion hole is positioned upward by inclining with respect to an upper surface of the top wall of the casing, and the male screw for the supporting member is a hexagon socket head cap screw preferably.

In the integrated fluid control apparatus, since the plurality of lines are installed in parallel, it is difficult to secure a working space. However, by inclining the screw insertion hole (and the female screw portion in associated therewith), utilization of the space present above the top wall of the casing is enabled, so that the attachment of the supporting member is achieved so as to avoid interference with the casing, the supporting member or the like.

A thermal sensor installation structure with respect to the fluid control apparatus of the present invention is a thermal sensor installation structure for installing a thermal sensor configured to measure a temperature of a fluid flowing in a fluid channel of a flow rate controller on the fluid control apparatus including the flow rate controller configured to control the flow rate, and an opening-and-closing valve having a casing arranged adjacently to the flow rate controller and an opening-and-closing mechanism integrated therein, and configured to block and release the fluid channel of the flow rate controller, characterized in that a supporting member configured to support the thermal sensor is provided, and the supporting member is detachably attached to the casing of the opening-and-closing valve from above the casing.

The detecting end of the thermal sensor is preferably configured to allow insertion into the leak port provided on the flow rate controller.

Preferably, the supporting member includes an annular main body provided with a slit at one position in a circumferential direction, and a pair of projecting portions provided integrally with the main body so as to extend the slits provided with the main body radially outward, and an inner peripheral surface of the main body has a shape corresponding to an outer periphery of the top wall of the casing of the opening-and-closing valve.

Preferably, one of the projecting portions is provided with the screw insertion hole for allowing insertion of a male screw for the supporting member from an opposite surface to a surface opposing the other projecting portion, and the other projecting portion is provided with a female screw portion with which the male screw for the supporting member engages so as to extend in the same direction as the screw insertion hole.

The screw insertion hole and the female screw portion are provided so that the screw insertion hole is positioned upward by inclining and the male screw for the supporting member is a hexagon socket head cap screw preferably.

Advantageous Effects of Invention

According to the fluid control apparatus of the present invention, since the supporting member attached to any one of the first fluid control instrument and the second fluid control instrument and configured to support the thermal sensor is further provided, the thermal sensor is attached to the first fluid control instrument, and the supporting member configured to support the thermal sensor is required to be attached to only one of the fluid control instruments (the fluid control instrument which allows easier installation), so that installation of the thermal sensor is achieved by using the space in the fluid control apparatus effectively and with a simple work.

According to the thermal sensor installation structure with respect to the fluid control apparatus of the present invention, since the supporting member configured to support the thermal sensor is detachably attached to the casing of the opening-and-closing valve from above the casing, the installation of the thermal sensor is achieved by using the space in the fluid control apparatus effectively and with a simple work

Figure 1:
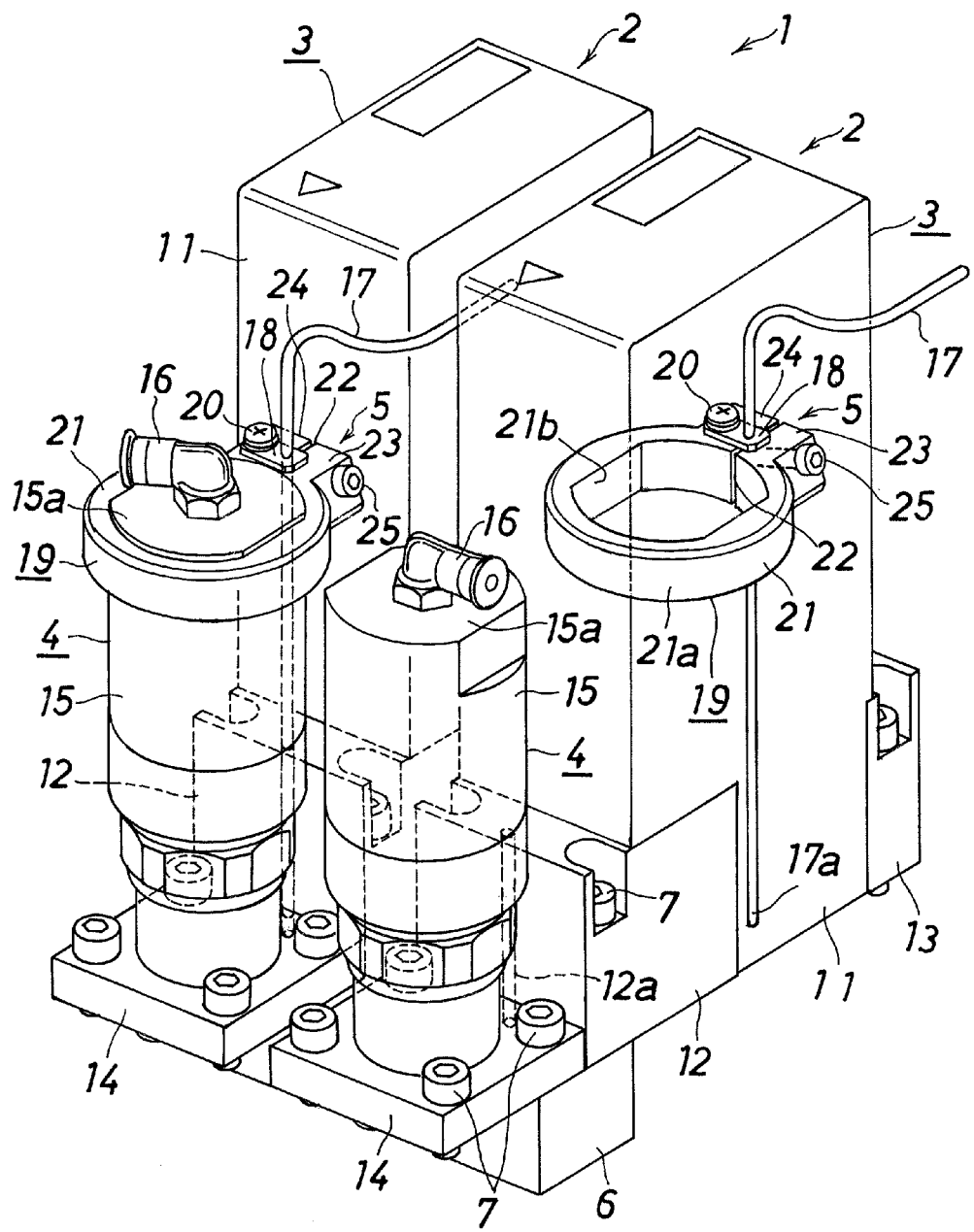
FIG. 1 is a perspective view of an embodiment of a fluid control apparatus and a thermal sensor installation structure with respect to the fluid control apparatus of the invention.
Figure 2:
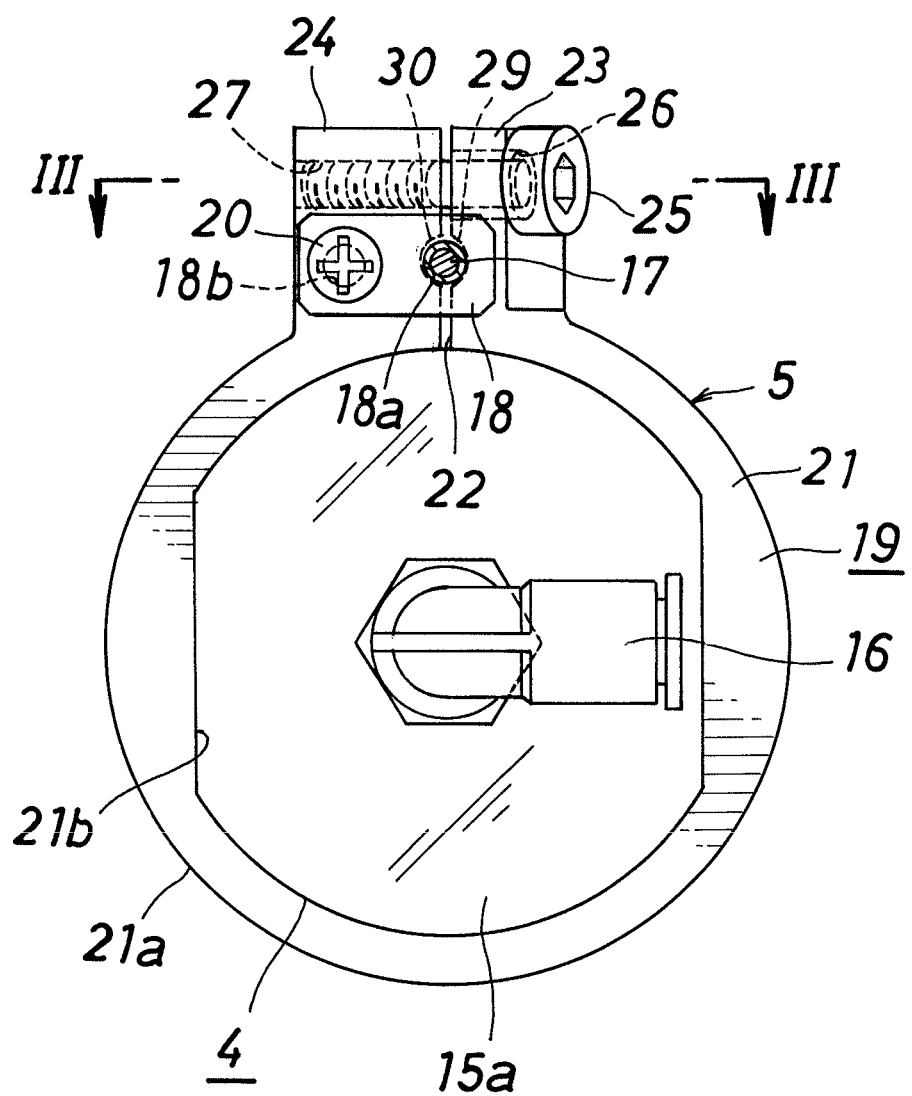
FIG. 2 is a plan view of a principal portion of FIG. 1.

REFERENCE SIGNS LIST (1) fluid control apparatus, (3) flow rate controller (first fluid control instrument), (4) opening-and-closing valve (second fluid control instrument), (12a) leak port, (15) casing, (15a) top wall (17) thermal sensor (17a) detecting end portion, (19) supporting member (21) main body (21b) inner peripheral surface (22) slit (23) first projecting portion (24) second projecting portion (25) male screw for the supporting member (26) screw insertion hole, (27) female screw portion

DESCRIPTION OF EMBODIMENTS

Embodiments of the invention will be described with reference to the drawings below. In the following description, expressions upper and lower correspond to upper and lower of FIG. 1. The opening-and-closing valve side in FIG. 1 corresponds to front and a flow rate controller side corresponds to rear. The expressions upper, lower, front and rear are used for the sake of convenience, and the apparatus may be used with the upper and lower sides replaced by the left and right sides.

FIG. 1 illustrates part of two lines (2) of the integrated fluid control apparatus (1) including a plurality of lines.

The respective line (2) includes the flow rate controller (first fluid control instrument) (3), an opening-and-closing valve (second fluid control instrument) (4) configured to block and release a fluid channel of the flow rate controller (3) (not illustrated), a plurality of fluid control instruments (another opening-and-closing valve, regulator, filter and the like) which is not shown and a thermal sensor unit (5) configured to control the temperature of a fluid flowing in the fluid channel of the flow rate controller (3).

The flow rate controller (3) is referred to as a mass flow controller and includes a main body (11) having a function of adjusting the flow rate integrated therein and front and rear protruding channel blocks (12) (13) supporting the same. The protruding channel block (12) is provided with a leak port (12a) used in a leakage test for the flow rate controller (3) so as to open upward.

The opening-and-closing valve (4) is an air operate valve and includes a cubic block-shaped main body (14) having a channel communicating with the fluid channel of the flow rate controller (3), and a casing (15) provided upward of the main body (14) and having an actuator (opening and closing mechanism) integrated therein.

The casing (15) includes a top wall (15a) and a joint portion (16) configured to connect a compressed air introduction tube configured to introduce compressed air into the interior of the casing (15) at a center portion of the top wall (15a) is provided. The top wall (15a) has a shape like a disc having both sides cut off.

The fluid channel of the flow rate controller (3) and a fluid channel of the opening-and-closing valve (4) communicate with each other by a channel block (6) provided downward of the front protruding channel block (12) and the main body (14) of the opening-and-closing vale (4) so as to straddle the same. The front protruding channel block (12) and the main body (14) of the opening-and-closing valve (4) are fixed to the channel block (6) by a hexagon socket head cap screw (7) from above.

The thermal sensor unit (5) includes a thermal sensor (17) having a cord shape having a detecting end portion (17a) at a distal end thereof, a flange (18) passing through the thermal sensor (17) and a supporting member (19) attached to the opening-and-closing valve (4) and supporting the thermal sensor (17).

The thermal sensor (17) is provided with a sheath thermocouple.

The flange (18) has a square plate shape, and includes a sensor insertion hole (18a) configured to allow insertion of the thermal sensor (17), and a screw insertion hole (18b) configured to allow insertion of a flange male screw (20) for fixing the flange (18) with screwing.

The supporting member (19) includes an annular main body (21) provided with a slit (22) at one position in the circumferential direction, and a pair of projecting portions (first projecting portion (23) and a second projecting portion (24)) provided integrally on the main body (21) so as to extend the slit (22) provided on the main body (21) radially outwardly.

The main body (21) has an outer peripheral surface (21a) having a short cylindrical surface, and an inner peripheral surface (21b) having a shape corresponding to the outer periphery of the top wall (15a) of the casing (15) (for example, both sides of the cylindrical surface are flat surfaces). The main body (21) is provided with the slit (22), so that resiliency in a direction of widening or narrowing the width of the slit (22).

The first projecting portion (23) is provided with a screw insertion hole (26) for allowing a male screw (25) for the supporting member to be inserted thereto from a surface on the opposite side to the surface opposing the second projecting portion (24) for the supporting member. The second projecting portion (24) is provided with a female screw portion (27) with which the male screw (25) for the supporting member is engaged so as to extend in the same direction as the screw insertion hole (26). The second projecting portion (24) is further provided with a female screw portion (28) extending upward.

Figure 3:
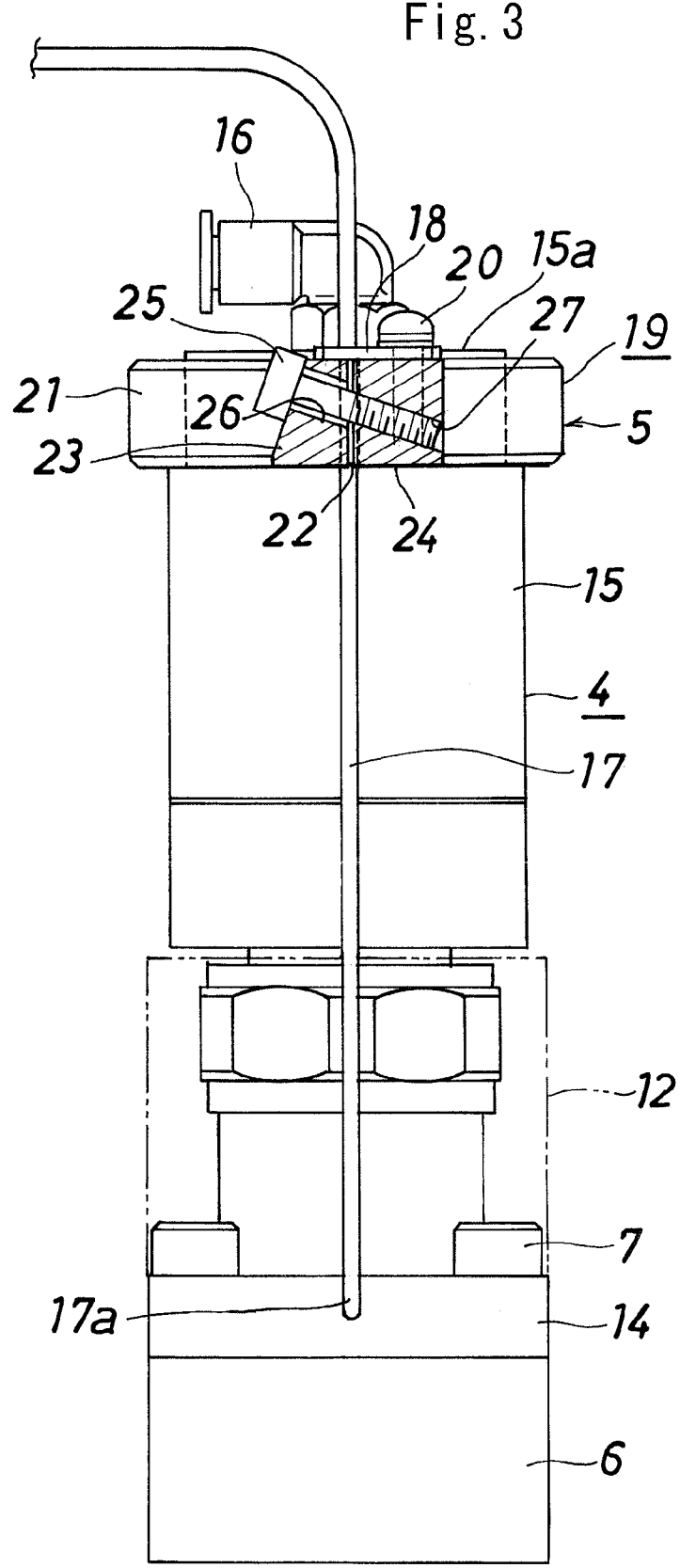
FIG. 3 is a cross-sectional view taken along the line III-III in FIG. 2.
Figure 4:
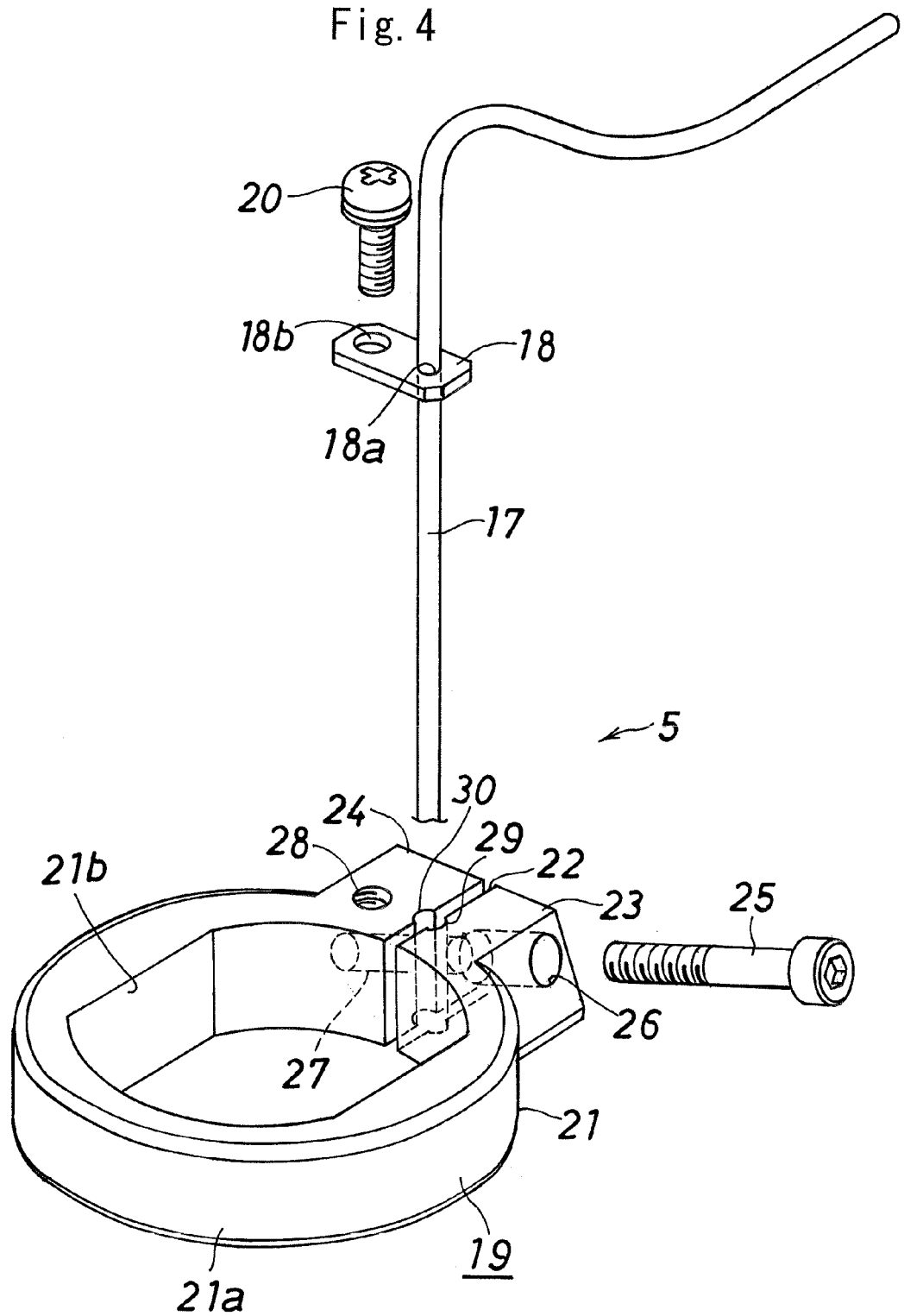
FIG. 4 is an exploded perspective view of a thermal sensor unit.

The screw insertion hole (26) and the female screw portion (27) are orthogonal to a direction of extension of the slit (22) when viewed from above as illustrated clearly in FIG. 3, but is inclined so that the insertion hole (26) comes upward with reference to the horizontal surface (a lower surface of the opening-and-closing valve (4), an upper surface of the top wall (15a) of the casing (15) and the like). The male screw (25) for the supporting member is a hexagon socket head cap screw, which can be tightened by using a tightening jig specific for the hexagon socket head cap screw.

The inner peripheral surface (21b) of the annular main body (21) of the supporting member (19) has a shape, which can be fitted loosely onto the outer peripheral surface of the top wall (15a) of the casing (15). Therefore, by tightening the male screw (25) for the supporting member, the width of the slit (22) is narrowed, whereby the supporting member (19) is fixed to the casing (15).

Surfaces of the pair of projecting portions (23) (24) opposing each other are provided with depressions (29) (30) respectively having a semi-circular cross-section extending in the vertical direction, and the thermal sensor (17) is inserted into a through-whole portion formed by these two depressions (29) (30). If the male screw (25) for the supporting member is tightened in order to fix the supporting member (19) to the casing (15), the depressions (29) (30) get closer to each other, and the thermal sensor (17) is clamped between the two depressions (29) (30).

The flange (18) having the thermal sensor (17) inserted into the sensor insertion hole (18a) is attached to the supporting member (19) by tightening the flange male screw (20) in a state in which the supporting member (19) is not attached on the opening-and-closing valve (4). The supporting member (19) to which the thermal sensor (17) is attached is fitted to the casing (15) from above and, in this state, the detecting end portion (17a) of the thermal sensor (17) is inserted into the leak port (12a), and then the supporting male screw (25) is tightened. When tightening the male screw (25) for the supporting member, since the insertion hole (26) and the female screw portion (27) are inclined, working from above the top wall (15a) of the casing (15) is enabled, so that the supporting member (19) may be attached while avoiding interference of the adjacent opening-and-closing valve (4) with respect to the top wall (15a) and the thermal sensor unit (5). In this manner, the thermal unit (5) is detachably attached to the opening-and-closing valve (4).

In order to measure the temperature of the fluid (gas), it is preferable to arrange the detecting end portion (17a) of the thermal sensor (17) at a position as close to the fluid as possible. By using the leak port (12a) provided on the protruding block (12) of the flow rate controller (3), the temperature may be measured with high degree of accuracy.

When using the leak port (12a), it is also possible to fix the flange (18) to which the thermal sensor (17) is inserted to the front protruding channel block (12) by using the hexagon socket head cap screw (7) fixed the front protruding channel block (12) to the channel block (6). In this case, however, it is also possible to remove the flow rate controller (3) at the time of attaching and detaching the thermal sensor (17) and hence the line is opened to the atmosphere and a problem that mounting and demounting of the thermal sensor (17) takes a lot of troubles arises.

In the above-described embodiment, it is not necessary to remove the flow rate controller (3), and attaching and detaching of the thermal sensor unit (5) can be performed without affecting the function of the fluid control apparatus (1). In addition, since the thermal sensor unit (5) is fixed by using the opening-and-closing valve (4), the space present in the fluid control apparatus (1) is effectively utilized, so that installation of the thermal sensor unit (5) is possible even when attaching of the thermal sensor (17) by the use of the hose band is difficult in terms of space.

In the description described above, the mas flow controller is exemplified as the flow rate controller (3). However, the fluid variable flow rate control apparatus may be made as the flow rate controller (3). Instead of installing the thermal sensor unit (5) by using the flow rate controller (3) and the opening-and-closing valve (4), other two fluid control instruments adjacent to each other may be used. In this case, an inner peripheral surface shape of the main body of the supporting member is changed as needed in accordance with the shape of the fluid control instrument to which the supporting member is attached. An outer peripheral surface shape of the main body of the supporting member may be a circumferential surface (cylindrical shape) as described above, and may be a square cylindrical shape.

INDUSTRIAL APPLICABILITY

According to the invention, since the thermal sensor may be installed easily to the fluid control apparatus used in the semiconductor manufacturing apparatus and the like, the control accuracy of the fluid control apparatus is improved and the application is expanded.

The invention claimed is:

1. A fluid control apparatus comprising a first fluid control instrument and a second fluid control instrument adjacent to each other and a thermal sensor configured to measure a temperature of a fluid flowing in a fluid channel of the first fluid control instrument,
   further comprising a supporting member attached to one of the first fluid control instrument and the second fluid control instrument to support the thermal sensor,
   wherein the second fluid control instrument includes a casing having an opening-and-closing mechanism integrated therein, and the supporting member is preferably detachably attached to the casing from above the casing,
   wherein the supporting member includes a main body, and an inner peripheral surface of the main body has a shape corresponding to an outer peripheral surface of a top wall of the casing.

2. The fluid control apparatus according to claim 1, wherein
   the first fluid control instrument controls a flow rate, and the second fluid control instrument is the opening-and-closing valve configured to block and release the fluid channel of the first fluid control instrument.

3. The fluid control apparatus according to claim 1, wherein
   the first fluid control instrument includes a leak port, and a detecting end portion of the thermal sensor is inserted into the leak port.

4. The fluid control apparatus according to claim 1, wherein,
   the supporting member main body is provided with a slit at one position in a circumferential direction, and a pair of projecting portions provided integrally with the main body so as to extend the slits provided with the main body radially outward.

5. The fluid control apparatus according to claim 4, wherein
   one of the projecting portions is provided with a screw insertion hole for allowing insertion of a male screw for the supporting member from an opposite surface to a surface opposing the other projecting portion, and the other projecting portion is provided with a female screw portion with which the male screw for the supporting member engages so as to extend in the same direction as the screw insertion hole.

6. The fluid control apparatus according to claim 5, wherein
   the screw insertion hole and the female screw portion are provided by inclining so that the screw insertion hole is positioned upward with respect to an upper surface of the top wall of the casing, and the male screw for the supporting member is a hexagon socket head cap screw.

7. A thermal sensor installation structure for installing a thermal sensor configured to measure a temperature of a fluid flowing in a fluid channel of a flow rate controller on a fluid control apparatus including the flow rate controller configured to control the flow rate, and an opening-and-closing valve having a casing arranged adjacently to the flow rate controller and an opening-and-closing mechanism integrated therein, and configured to block and release the fluid channel of the flow rate controller, characterized in that
   a supporting member configured to support the thermal sensor is provided, and the supporting member is detachably attached to the casing of the opening-and-closing valve from above the casing,
   wherein the supporting member includes a main body, and an inner peripheral surface of the main body has a shape corresponding to an outer peripheral surface of a top wall of the casing of the opening-and-closing valve.

8. A thermal sensor installation structure with respect to a fluid control apparatus according to claim 7, wherein
   a detecting end portion of the thermal sensor is configured to allow insertion into a leak port provided on the flow rate controller.

9. The thermal sensor installation structure with respect to the fluid control apparatus according to claim 7, wherein,
   the supporting member main body is provided with a slit at one position in a circumferential direction, and a pair of projecting portions provided integrally with the main body so as to extend the slits provided with the main body radially outward.

10. The thermal sensor installation structure with respect to the fluid control apparatus according to claim 9, wherein
    one of the projecting portions is provided with a screw insertion hole for allowing insertion of a male screw for the supporting member from an opposite surface to a surface opposing the other projecting portion, and the other projecting portion is provided with a female screw portion with which the male screw for the supporting member engages so as to extend in the same direction as the screw insertion hole.

11. The thermal sensor installation structure with respect to the fluid control apparatus according to claim 10, wherein
    the screw insertion hole and the female screw portion are obliquely provided so that the screw insertion hole is positioned upward, and the male screw for the supporting member is a hexagon socket head cap screw.

* * * * *